United States Patent
Demott et al.

(10) Patent No.: US 10,494,286 B2
(45) Date of Patent: Dec. 3, 2019

(54) PROCESS FOR MANUFACTURING VITRIFIED MATERIAL BY MELTING

(71) Applicant: KNAUF INSULATION, Vise (BE)

(72) Inventors: Gerard Demott, Majcichov (SK); Bostjan Marolt, Poljane (SI); Randy Etzkorn, Visé (BE); David Ducarme, Wavre (BE)

(*) Notice: Subject to any disclaimer, the term of this patent is extended or adjusted under 35 U.S.C. 154(b) by 0 days.

(21) Appl. No.: 14/908,348

(22) PCT Filed: Jul. 30, 2014

(86) PCT No.: PCT/EP2014/066441
§ 371 (c)(1),
(2) Date: Jan. 28, 2016

(87) PCT Pub. No.: WO2015/014918
PCT Pub. Date: Feb. 5, 2015

(65) Prior Publication Data
US 2016/0207814 A1 Jul. 21, 2016

(30) Foreign Application Priority Data

Jul. 31, 2013 (GB) .................................. 1313656.9

(51) Int. Cl.
| | | |
|---|---|---|
| *C03B 5/00* | (2006.01) | |
| *C03B 5/235* | (2006.01) | |
| *C03C 1/00* | (2006.01) | |
| *C03C 13/06* | (2006.01) | |
| *C03B 5/12* | (2006.01) | |

(Continued)

(52) U.S. Cl.
CPC ................ *C03B 5/005* (2013.01); *C03B 5/12* (2013.01); *C03B 5/183* (2013.01); *C03B 5/2356* (2013.01); *C03B 5/44* (2013.01); *C03B 37/02* (2013.01); *C03C 1/002* (2013.01); *C03C 3/087* (2013.01); *C03C 13/06* (2013.01); *C03B 2211/22* (2013.01); *C03B 2211/70* (2013.01)

(58) Field of Classification Search
None
See application file for complete search history.

(56) References Cited

U.S. PATENT DOCUMENTS

| | | |
|---|---|---|
| 3,248,205 A | 4/1966 | Dolf et al. |
| 3,260,587 A | 7/1966 | Dolf et al. |

(Continued)

FOREIGN PATENT DOCUMENTS

| | | |
|---|---|---|
| DE | 10029983 A1 | 1/2002 |
| EP | 0086858 A1 | 8/1983 |

(Continued)

OTHER PUBLICATIONS

"Energy-efficient glass melting—The next generation melter—Final Report" (82 pages), David Rue, US Gas Technology Institute Project 20621, pp. 26-30, Figures 23-41 and pp. 1-73, Figures 23, 25, 61, 68, and 70—Mar. 1, 2008.

(Continued)

*Primary Examiner* — Cynthia Szewczyk
(74) *Attorney, Agent, or Firm* — Knauf Insulation, Inc.; James K. Blodgett

(57) ABSTRACT

Vitrified products are manufactured using a melt produced from batch materials comprising 35 to 100 w % man-made mineral fibers produced in a submerged combustion melter.

26 Claims, 4 Drawing Sheets

(51) Int. Cl.
*C03B 5/183* (2006.01)
*C03B 5/44* (2006.01)
*C03C 3/087* (2006.01)
*C03B 37/02* (2006.01)

(56) References Cited

U.S. PATENT DOCUMENTS

| | | | |
|---|---|---|---|
| 3,592,151 A | 7/1971 | Webber | |
| 4,422,862 A * | 12/1983 | Wardlaw | C03B 3/00 65/28 |
| 4,544,394 A | 10/1985 | Knat | |
| 4,622,007 A | 11/1986 | Gitman | |
| 4,632,687 A | 12/1986 | Kunkle et al. | |
| 5,062,789 A | 11/1991 | Gitman | |
| 5,100,453 A * | 3/1992 | Richards | C03B 3/00 588/254 |
| 5,104,310 A | 4/1992 | Saltin | |
| 5,728,190 A | 3/1998 | Pieper et al. | |
| 5,770,535 A | 6/1998 | Brix et al. | |
| 5,954,498 A * | 9/1999 | Joshi | C03B 5/2353 431/8 |
| 6,047,566 A * | 4/2000 | Fleckenstein | C03B 5/005 65/134.8 |
| 6,109,062 A | 8/2000 | Richards | |
| 6,460,376 B1 | 10/2002 | Jeanvoine et al. | |
| 7,273,583 B2 | 9/2007 | Rue et al. | |
| 8,899,224 B2 | 12/2014 | Cowles | |
| 9,150,446 B2 | 10/2015 | Douxchamps et al. | |
| 9,533,905 B2 | 1/2017 | Charbonneau et al. | |
| 9,643,871 B2 | 5/2017 | Cowles et al. | |
| 2002/0000100 A1 | 1/2002 | Burg et al. | |
| 2002/0162358 A1 | 11/2002 | Jeanvoine et al. | |
| 2005/0039491 A1 | 2/2005 | Maugendre et al. | |
| 2005/0236747 A1 | 10/2005 | Rue et al. | |
| 2006/0000239 A1 | 1/2006 | Jeanvoine et al. | |
| 2006/0105899 A1 | 5/2006 | Jacques et al. | |
| 2008/0145804 A1 | 6/2008 | Palmieri et al. | |
| 2008/0184919 A1 | 8/2008 | D'Agostini et al. | |
| 2008/0256981 A1 | 10/2008 | Jacques et al. | |
| 2008/0276652 A1 | 11/2008 | Bauer et al. | |
| 2009/0176639 A1 | 7/2009 | Jacques et al. | |
| 2011/0236846 A1 | 9/2011 | Rue et al. | |
| 2011/0251043 A1* | 10/2011 | Brown | C03B 37/06 501/36 |
| 2011/0308280 A1 | 12/2011 | Huber | |
| 2012/0077135 A1 | 3/2012 | Charbonneau | |
| 2013/0086944 A1 | 4/2013 | Shock et al. | |
| 2013/0086949 A1 | 4/2013 | Charbonneau | |
| 2013/0086950 A1 | 4/2013 | Huber et al. | |
| 2013/0086951 A1 | 4/2013 | Charbonneau et al. | |
| 2013/0086952 A1 | 4/2013 | Charbonneau et al. | |
| 2013/0260980 A1 | 10/2013 | Touslee et al. | |
| 2013/0283861 A1 | 10/2013 | Mobley et al. | |
| 2013/0327092 A1 | 12/2013 | Charbonneau | |
| 2014/0007622 A1 | 1/2014 | Shock et al. | |
| 2014/0007623 A1 | 1/2014 | Charbonneau et al. | |
| 2014/0090423 A1 | 4/2014 | Charbonneau et al. | |
| 2014/0144185 A1 | 5/2014 | Shock et al. | |
| 2015/0225274 A1 | 8/2015 | Solvang et al. | |
| 2015/0274578 A1 | 10/2015 | Solvang et al. | |
| 2015/0291465 A1 | 10/2015 | Cowles et al. | |
| 2016/0060154 A1 | 3/2016 | Cowles et al. | |
| 2016/0075586 A1 | 3/2016 | Charbonneau et al. | |
| 2016/0083279 A1 | 3/2016 | Cai et al. | |
| 2016/0130168 A1 | 5/2016 | Cowles et al. | |
| 2016/0145135 A1 | 5/2016 | Baker | |
| 2016/0159675 A1 | 6/2016 | DeMott et al. | |
| 2016/0159676 A1 | 6/2016 | DeMott et al. | |
| 2016/0168001 A1 | 6/2016 | DeMott et al. | |
| 2016/0185642 A1 | 6/2016 | DeMott et al. | |
| 2016/0207814 A1 | 7/2016 | DeMott et al. | |

FOREIGN PATENT DOCUMENTS

| | | |
|---|---|---|
| EP | 2578548 A2 | 4/2013 |
| FR | 2837916 A1 | 10/2003 |
| JP | 2012096942 A | 5/2012 |
| SU | 425853 | 4/1974 |
| WO | 8707591 A1 | 12/1987 |
| WO | 9854101 A1 | 12/1998 |
| WO | 2008084138 A1 | 7/2008 |

OTHER PUBLICATIONS

"Submerged Combustion Melting of Glass" (14 pages, pp. 262-274), David Rue and John T. Brown, International Journal of Applied Glass Science, vol. 2, No. 4, pp. 270-271, Figure 2—Nov. 9, 2011.

"Submerged Combustion Melter" (9 pages), David Rue, Walter Kunc, and Victor A. Nosovitsky, Institute of Gas Technology (Chicago, IL), Vladimir M. Olabin and Alexander B. Maximuk (Gas Institute, Naval Academy of Sciences (Kiev, Ukraine), American Research Conference, Chicago, IL, Sep. 21-22, 1997.

"Energy-efficient glass melting—The next generation melter" (24 pages), David Rue, Gas Technology Institute, DOE Industrial Technology Program, 2005 Project-Industry Review, Sep. 15, 2005.

Office action for co-pending U.S. Appl. No. 14/908,767 (13 pages)—Sep. 7, 2018.

Office action for co-pending U.S. Appl. No. 14/908,757 (21 pages)—Jan. 23, 2018.

Office action for co-pending U.S. Appl. No. 14/908,757 (20 pages)—Aug. 27, 2018.

Notice of Allowance for co-pending U.S. Appl. No. 14/908,360 (10 pages)—Oct. 11, 2016.

Notice of Allowance for co-pending U.S. Appl. No. 14/908,360 (9 pages)—Sep. 6, 2017

Notice of Allowance for co-pending U.S. Appl. No. 14/908,357 (8 pages)—Feb. 21, 2018.

Written Opinion of International Searching Authority re PCT/EP2014/066440 (7 pages)—Nov. 3, 2014.

Written Opinion of International Searching Authority re PCT/EP2014/066441 (7 pages)—Nov. 3, 2014.

Written Opinion of International Searching Authority re PCT/EP2014/066442 (5 pages)—Nov. 7, 2014.

Written Opinion of International Searching Authority re PCT/EP2014/066443 (7 pages)—Nov. 13, 2014.

Written Opinion of International Searching Authority re PCT/EP2014/066444 (6 pages)—Nov. 7, 2014.

Office action for co-pending U.S. Appl. No. 14/908,767 (14 pages)—Nov. 16, 2017.

Office action for co-pending U.S. Appl. No. 14/908,757 (16 pages)—Apr. 17, 2017.

Office action for co-pending U.S. Appl. No. 14/908,360 (15 pages)—Mar. 23, 2017.

Office action for co-pending U.S. Appl. No. 14/908,357 (12 pages)—Jun. 27, 2017.

"Deposits and condensation from flue gases in glass furnaces," Beerkens, R.G.C., Eindhoven: Technische, Universiteit Eindhoven DOI: 10.6100/IR25404 (227 pages, 1986).

"Modelling the evaporation of boron species. Part 1. Alkali-free borosilicate glass melts," Van Limpt, H., Beerkens, R., Cook, S., O'Conner, R., Simon, J., Glass Technol.: Eur. J. Glass Sci. Technol. A, Jun. 2011, 52, (3), pp. 77-87.

"Analysis of elementary process steps in industrial glass melting tanks—some ideas on innovations in industrial glass melting," Beerkens, R., paper presented at the seminar "Advanced glass materials and innovative glass melting technology in the year 2020," Brig, Switzerland, Mar. 26-29, 2008, pp. 206-217.

* cited by examiner

PROCESS FOR MANUFACTURING VITRIFIED MATERIAL BY MELTING

CROSS-REFERENCE TO RELATED APPLICATIONS

This application is a U.S. national counterpart application under 35 U.S.C. § 371 of International Application Serial No. PCT/EP2014/066441, filed Jul. 30, 2014, which claims priority to GB Application Serial No. 1313656.9, filed Jul. 31, 2013, the entire disclosures of which are expressly incorporated by reference herein.

TECHNICAL FIELD

The present invention relates to a process for manufacturing vitrified products notably making use of recycled and/or scrap mineral fibers.

BACKGROUND

Glass melts are generally prepared from a mixture of raw materials, for example sand, limestone, soda ash, basalt, glass cutlet and other constituents melted in a melter at temperatures in the order of 1250 to 1500° C. The melt is subsequently submitted to a forming step for example for manufacture of flat glass, hollow glass, continuous fibers for reinforcement purposes or fibers for insulation purposes; a melt refining step may be required upstream of the forming process. The chemical composition of the melt and its physical properties are selected as a function of the intended use and the forming process.

In the manufacturing of mineral wool insulation products, a certain amount of waste material is produced, for example from trimming manufactured products to desired dimension. The presence of organic material on the fibers, for example binder or resin, renders the recycling of such waste material in the manufacturing process difficult. In addition, increasing use of mineral wool insulation materials in the construction industry also leads to increasing quantities of waste insulation material being generated in case of destruction or refurbishing.

SUMMARY

The present invention seeks to provide an improved process for manufacturing a vitrified material, notably making use of waste or scrap man-made mineral fibers when melting solid batch material.

BRIEF DESCRIPITION OF THE DRAWINGS

FIGS. 1a and 1b are schematic representation of a torodial flow pattern;
FIG. 2 shows a vertical section through a melter; and
FIG. 3 is a schematic representation of a burner layout.

DETAILED DESCRIPTION

The process of the present invention comprises loading a solid raw material mix comprising from 35 to 100 w % man-made mineral fibers into a submerged combustion melter and melting the solid raw material mix.

Submerged combustion melters have one or more burner nozzles arranged below the surface of the melt such that the burner flame and/or combustion products pass through the melt.

The man-made mineral fibers may comprise glass fibers, glass wool fibers and/or stone wool fibers; they may comprise waste fibers, scrap fibers and/or recycled fibers. The man-made mineral fibers may be in the form of flocs, that is to say in the form of pieces of mineral wool which comprise an agglomerate of individual mineral wool fibers, for example having a dimension of between 5 and 30 mm across.

The man-made mineral fibers may comprise organic materials, notable organic materials present at the surface of the fibers and/or at intersections between fibers, for example organic resins or binders. The organic content of the man-made mineral fibers may be at least 1.5 w %, at least 2 w %, at least 2.5 w %, at least 3 w % or at least 3.5 w %; it may be no more than 15 w %, no more than 12 w % or no more than 10 w %. The organic content of the man-made mineral fibers may be determined as loss on ignition (LOI), for example by measuring the initial weight of a sample of the man-made mineral fibers, subsequently subjecting the sample to a temperature sufficient to decompose and release the organics, for example a temperature of about 530° C. for a duration of 20 minutes, and measuring the weight of the sample after release of the organics. Where the organic content comprises a resin or binder, this may be water insoluble.

It has been found that man-made mineral fibers may be added to the melt at such high levels without the need for additional oxygen or oxygen enriched air blowing into the melter, because submerged combustion efficiently burns organic materials coated on the fibers and absorbs the remaining mineral fibers into the molten bath where they get melted. This is particularly surprising as, although re-melting man-made mineral fibers has previously been proposed it has previously been thought that only small quantities of man-made mineral fibers may be re-melted in this way.

The man-made mineral fibers may advantageously be added at 40 to 100 preferably 50 to 100 w %, more preferably 60 to 100 of the raw material mix, the remainder being raw materials in other forms, for example comprising minerals in powdered form and/or cullet.

According to a preferred embodiment, the submerged combustion is performed such that a substantially toroidal melt flow pattern is generated in the melt, having a substantially vertical central axis of revolution, comprising major centrally inwardly convergent flows at the melt surface; the melt moves downwardly at proximity of the vertical central axis of revolution and is recirculated in an ascending movement back to the melt surface, thus defining an substantially toroidal flow pattern.

The generation of such a toroidal flow pattern ensures highly efficient mixing and homogenizes the melt in terms of temperature profile and composition. Moreover, it allows for suitable burning or decomposition of organics present on the fibers notably without additional oxygen injection, and for proper absorption of fibers into the glass melt despite their low density.

Advantageously, the melting steps comprises melting the solid batch material comprising fibers making up 35-100 w % of the solid batch material mix for forming a melt, in a submerged combustion melter by subjecting the melt to a flow pattern which when simulated by computational fluid dynamic analysis shows a substantially toroidal melt flow pattern in the melt, comprising major centrally inwardly convergent flow vectors at the melt surface, with the central axis of revolution of the toroid being substantially vertical.

At the vertical axis of revolution of said toroidal flow pattern, the flow vectors have a downward component reflecting significant downward movement of the melt in proximity of said axis. Towards the melter bottom, the flow vectors change orientation showing outward and then upward components.

Preferably the fluid dynamics model is code ANSYS R14.5, taking into consideration the multi-phase flow field ranging from solid batch material to liquid melt and gas generated in the course of the conversion, and the batch-to-melt conversion.

The melt obtained may be withdrawn for further downstream processing, for example for manufacture of flat glass, container glass, reinforcing fibers or mineral wool fibers, notably mineral wool for thermal and/or acoustic insulation. In the case of mineral wool fiber production, the output is preferably taken from the submerged combustion melter to fiberization without an intervening refining step.

A toroidal melt flow pattern may be obtained using submerged combustion burners arranged at the melter bottom in a substantially annular burner zone imparting a substantially vertically upward directed speed component to the combustion gases. Advantageously, the burners are arranged with a distance between adjacent burners of about 250-1250 mm, advantageously 500-900 mm, preferably about 600-800, even more preferably about 650-750 mm. It is preferred that adjacent flames do not merge.

Each burner axis and/or a speed vector of the melt moving upwards over or adjacent to the submerged burners may be slightly inclined from the vertical, for example by an angle which is ≥1°, ≥2°, ≥3° or and/or which is ≤30°, preferably ≤15°, more preferably ≤0°, notably towards the center of the melter. Such an arrangement may improve the flow and directs melt flow away from the outlet opening and/or towards a center of the melter thus favoring a toroidal flow and incorporation of man-made mineral fibers in to the melt.

According to a one embodiment, each central burner axis is inclined by a swirl angle with respect to a vertical plane passing through a central vertical axis of melter and the burner center. The swirl angle may be ≥1°, ≥2°, ≥3°, ≥5° and/or ≤30°, ≤20°, ≤15° or ≤10°. Preferably, the swirl angle of each burner is about the same. Arrangement of each burner axis at a swirl angle imparts a slightly tangential speed component to the upward blowing flames, thus imparting a swirling movement to the melt, in addition to the toroidal flow pattern. The obtained melt flow pattern further improves the mix of raw material into the melt and the homogeneity of the melt.

The burner zone is defined as a substantially annular zone. Burner arrangements, for example on an elliptical or ovoid line within the relevant zone are possible, but the burners are preferably arranged on a substantially circular burner line.

Preferably, the flow pattern comprises an inwardly convergent flow at the melt surface followed by a downwardly oriented flow in proximity of the central axis of revolution of the toroid. Said central axis of revolution advantageously corresponds to the vertical axis of symmetry of the melter. By axis of symmetry is meant the central axis of symmetry and, if the melter shows a transversal cross-section which does not have any single defined axis of symmetry, then the axis of symmetry of the circle in which the melter section is inscribed. The downwardly oriented flow is followed by an outwardly oriented flow at the bottom of the melter and a substantially annular upward flow at proximity of the burners, reflecting recirculation of melt toward the burner zone and in an ascending movement back to the melt surface, thus defining a substantially toroidal flow pattern.

The inwardly convergent flow vectors at the melt surface advantageously show a speed comprised between 0.1-3 m/s. The downward oriented speed vectors at proximity of the vertical central axis of revolution are preferably of significant magnitude reflecting a relatively high speed of material flowing downwardly. The downward speed vectors may be between 0.1-3 m/s. The melt and/or of the raw materials within the melter, at least at one portion of the melter and notably at the melt surface (particularly inwardly convergent flow vectors at the melt surface) and/or at or proximate a vertical central axis of revolution, may reach a speed which is ≥0.1 m/s, ≥0.2 m/s, ≥0.3 m/s or ≥0.5 m/s and/or which is ≤2.5 m/s, ≤2 m/s, ≤1.8 m/s or ≤1.5 m/s.

The preferred toroidal flow pattern ensures highly efficient mixing and homogenizes the melt in terms of temperature profile and composition. It also favors the absorption of raw material into the melt and improves heat transfer to fresh raw material.

This reduces required residence time in the melter prior to withdrawal for further forming, while avoiding or at least reducing the risk of raw material short cutting the melt circulation.

In one preferred embodiment, the burners are arranged at a distance of about 250-750 mm from the side wall of said melting chamber; this favors the preferred flow described above and avoids flame attraction to the melting chamber side walls. Too small a distance between burners and side wall may damage or unnecessarily stress the side wall. While a certain melt flow between burner and wall may not be detrimental and may even be desirable, too large a distance will tend to generate undesirable melt flows and may create dead zones which mix less with the melt in the center of the melter and lead to reduced homogeneity of the melt.

The distance between submerged burners is advantageously chosen such as to provide the desired toroidal flow pattern within the melt but also to avoid that adjacent flames merge. While this phenomenon depends on many parameters such as temperature and viscosity of the melt, pressure and other characteristics of the burners, it has been found advantageous to select a burner circle diameter comprised between about 1200 and 2000 mm. Depending on burner type, operating pressure and other parameters, too large a diameter will lead to diverging flames; too narrow a diameter will lead to merging flames.

Preferably at least 6 burners are provided, for example arranged on a burner circle line, more preferably 6 to 10 burners, even more preferably 6 to 8 burners, depending on the melter dimensions, burner dimensions, operating pressure and other design parameters.

Each burner or each of a plurality of a group of burners, for example opposed burners, may be individually controlled. Burners close to a raw material discharge may be controlled at different, preferably higher gas speeds and/or pressures than adjacent burners, thus allowing for improved heat transfer to the fresh raw material that is being loaded into the melter. Higher gas speeds may be required only temporarily, that is, in the case of batch wise loading of fresh raw material, just during the time period required for absorption of the relevant load into the melt contained in the melter.

It may also be desirable to control burners that are located close to a melt outlet at a lower gas speed/pressure in order not to disturb the outlet of the melt.

The melting chamber is preferably substantially cylindrical in cross section; nevertheless, it may have an elliptical cross section or polygonal cross section showing more than 4 sides, preferably more than 5 sides.

The raw materials may be loaded through an opening in the melter wall, above the melt surface. Said opening may be opened and closed, for example by a piston, to minimize escape of heat and fumes. Raw material may be prepared and loaded into an intermediate chute and subsequently fall into the melter, in an opposite direction to escaping fumes, onto the melt surface.

Melt may be withdrawn continuously or batch wise from the melter. Where raw material is loaded close to the melter wall, the melt outlet is preferably arranged opposite the material inlet. In the case of discontinuous discharge of melt, a discharge opening maybe controlled by, for example, a ceramic piston.

The submerged burners preferably inject high pressure jets of the combustion products into the melt that is sufficient to overcome the liquid pressure and to create forced upward travel of the flame and combustion products. The speed of the combustion and/or combustible gases, notably at the exit from the burner nozzle(s), may be ≥60 m/s, ≥100 m/s or ≥120 m/s and/or ≤350 m/s, ≤330 m/s, ≤300 or≤200 m/s. Preferably the speed of the combustion gases is in the range of about 60 to 300 m/s, preferably 100 to 200, more preferably 110 to 160 m/s.

The temperature of the melt may be between 1100° C. and 1600° C.; it may be at least 1200° C. or 1250° C. and/or no more than 1600° C., 1500° C. or 1450° C.

The height of a melt pool within the melter, especially when the melting chamber is substantially cylindrical, preferably with an internal diameter of the melting chamber of 1.5 m to 3 m and more preferably of 1.75-2.25 m, may be: ≥ about 0.75 m, ≥ about 0.8 m, ≥ about 0.85 m or ≥ about 0.9 m; and/or ≤ about 2.2 m, ≤ about 2 m, ≤ about 1.8 m, or ≤ about 1.6 m.

The melting chamber walls may comprise double steel walls separated by circulating cooling liquid, preferably water. Particularly in the case of a cylindrical melting chamber, such assembly is relatively easy to build and is capable of resisting high mechanical stresses. A cylindrical shape of the melter facilitates balance of stresses on the outside wall. As the walls are cooled, for example water cooled, melt preferably solidifies and forms a protective layer on the inside of the melter wall. The melter assembly may not require any internal refractory lining and therefore needs less or less costly maintenance. In addition, the melt is not contaminated with undesirable components of refractory material normally eroded from an internal refractory lining. The internal face of the melter wall may advantageously be equipped with tabs or pastilles or other small elements projecting towards the inside of the melter. These may help in constituting and fixing a layer of solidified melt on the internal melter wall generating a lining having thermal resistance and reducing the transfer of heat to the cooling liquid in the double walls of the melter.

The melter may be equipped with heat recovery equipment. Hot fumes from the melter may be used to preheat raw material or the thermal energy contained in them may be recovered. Similarly, the thermal energy contained in the cooling liquid circulating between the two walls of the melter may also be recovered for heating or other purposes.

The composition of the melt produced may comprise one or more of:

|  | Possible melt composition (% weight) | Preferred melt composition (% weight) |
| --- | --- | --- |
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| K2O | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| SiO2 + Al2O3 | 50-85 | 60-80 |

One or more aspects described in the following patent applications, which also relate to submerged combustion melting and/or melters, may be used in respect of the inventions of the present patent application and each of the following patent applications is hereby incorporated by reference:

| Application | Name of applicant | Priority claimed | Our ref |
| --- | --- | --- | --- |
| International PCT patent application PCT/EP2014/066440 filed on 30 Jul. 2014 | Knauf Insulation | GB 1313653.6 | P0524/PCT KMRecup |
| International PCT patent application PCT/EP2014/066442 filed on 30 Jul. 2014 | Knauf Insulation | GB 1313652.8 | P0523/PCT KMburn |
| International PCT patent application PCT/EP2014/066443 filed on 30 Jul. 2014 | Knauf Insulation | GB 1313654.4 | P0543/PCT KMGeo |
| International PCT patent application PCT/EP2014/066444 filed on 30 Jul. 2014 | Knauf Insulation | GB 1313651.0 | P0522/PCT KMMod |

An embodiment of a melter suitable for use in accordance with the present invention is described below, with reference to the appended drawings of which:

Figure 1A:
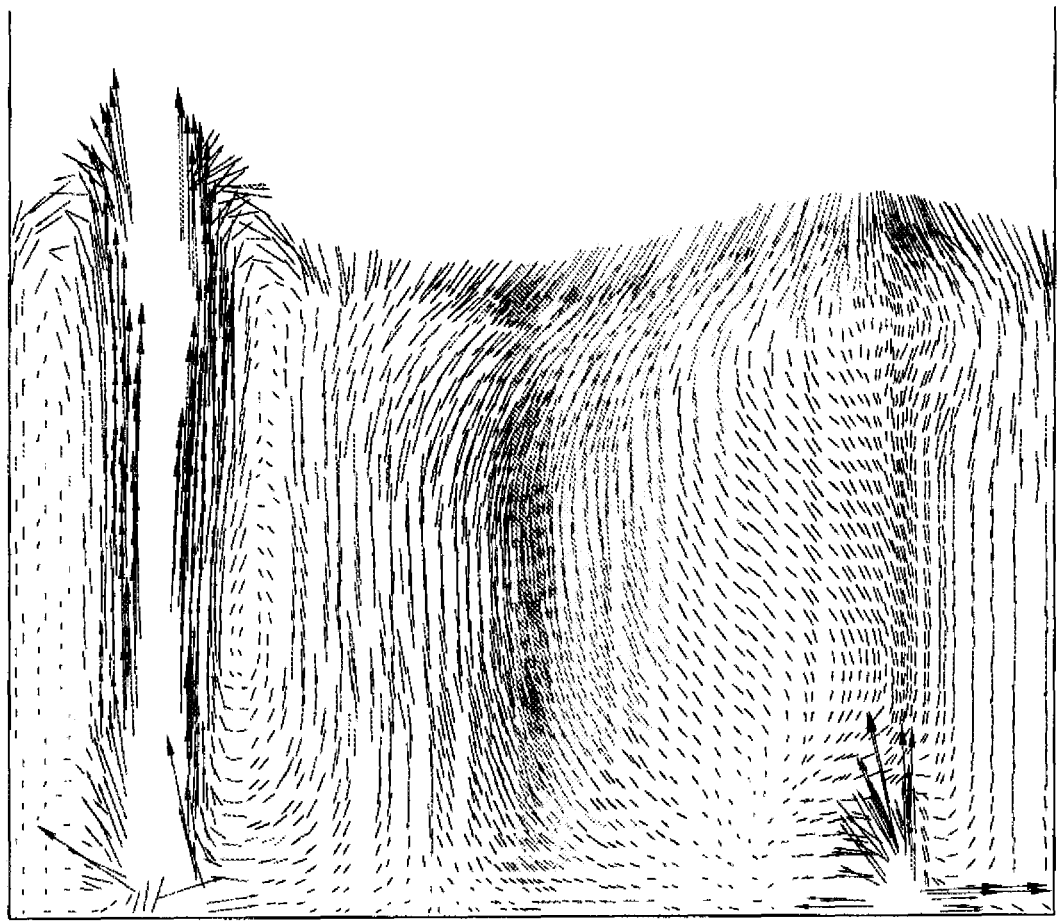
FIGS. 1a and 1b are schematic representation of a toroidal flow pattern.
Figure 1B:
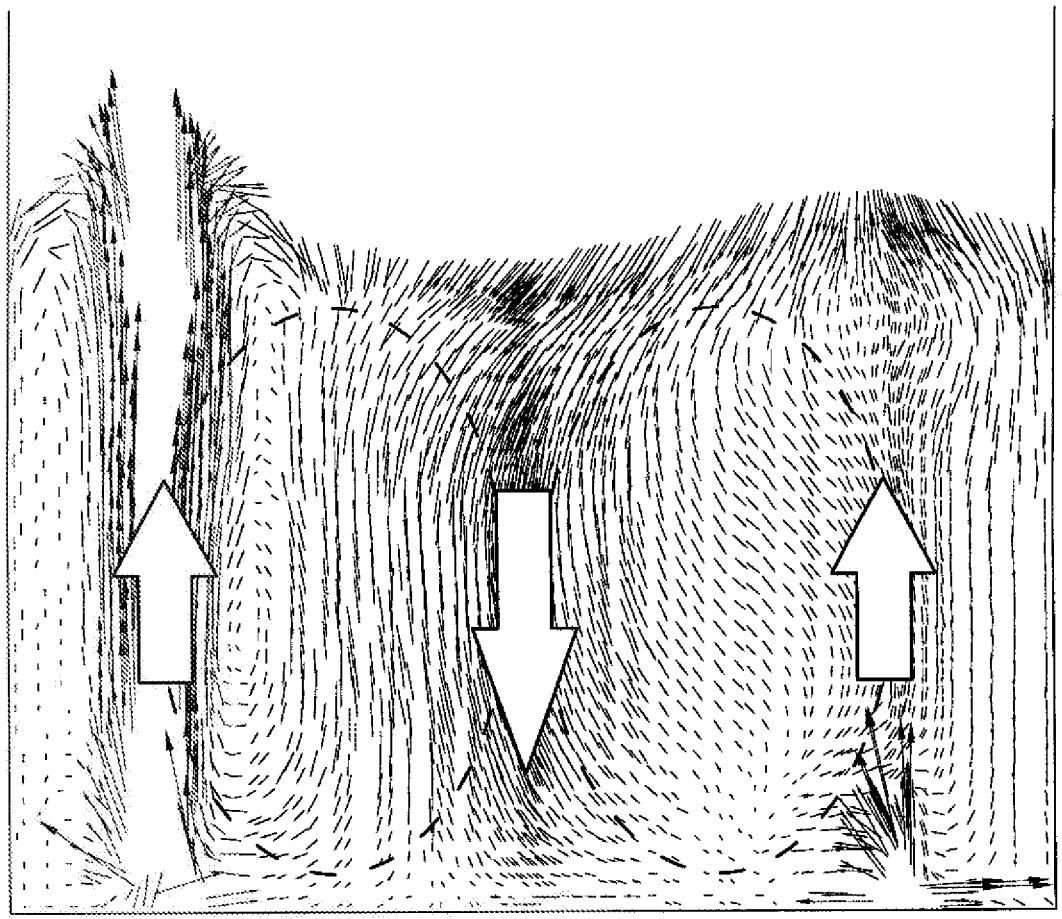
Figure 2:
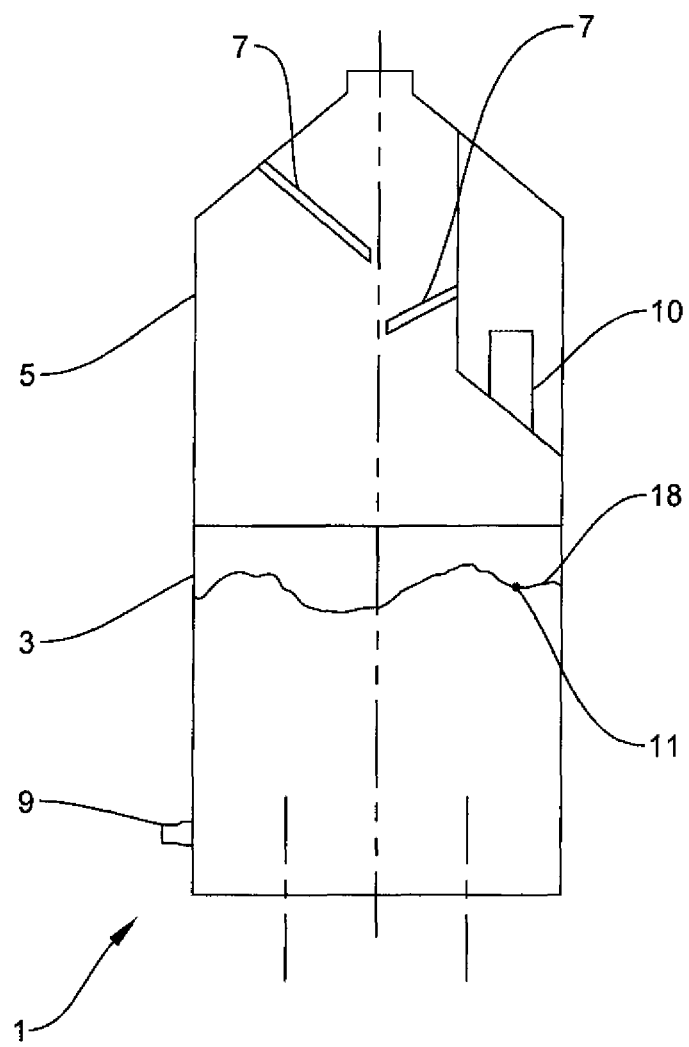
FIG. 2 shows a vertical section through a melter.
Figure 3:
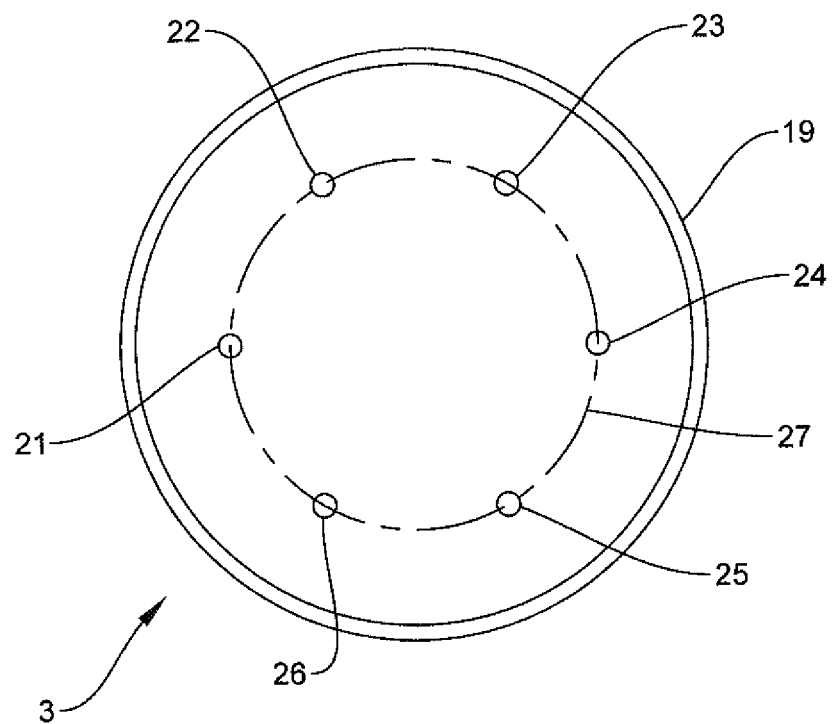
FIG. 3 is a schematic representation of a burner layout.

With reference to FIGS. 1a and 1b, a toroidal flow pattern is preferably established in which melt follows an ascending direction close to submerged burners 21, 22, 23, 24, 25, 26 which are arranged on a circular burner line 27, flows inwardly towards the center of the circular burner line at the melt surface, and flows downwards in the proximity of the said center. The toroidal flow generates agitation in the melt, ensures good stirring of the melt, efficient combustion of organic materials present with man-made mineral fibers used a raw materials and absorption of fibers and any other raw material into the melt.

The illustrated melter 1 comprises: a cylindrical melting chamber 3 having an internal diameter of about 2.0 m which contains the melt; an upper chamber 5; and a chimney for evacuation of the fumes. The upper chamber 5 is equipped with baffles 7 that prevent any melt projections thrown from the surface 18 of the melt being entrained into the fumes. A raw material feeder 10 is arranged at the upper chamber 5 and is designed to load fresh raw material including man-made mineral fibers into the melter 1 at a point 11 located above the melt surface 18 and close to the side wall of the melter. The feeder 10 comprises a horizontal feeding means, for example a feed screw, which transports the raw material mix to a hopper fastened to the melter, the bottom of which may be opened and closed by a vertical piston. The bottom of the melting chamber comprises six submerged burners 21, 22, 23, 24, 25, 26 arranged on a circular burner line 27 concentric with the melter axis and having a diameter of about 1.4 m. The melt may be withdrawn from the melting chamber 3 through a controllable outlet opening 9 located in the melting chamber side wall, close to the melter bottom, substantially opposite the feeding device 10.

The temperature within the melt may be between 1100° C. and 1600° C., or 1200° C. and 1500° C., or 1200° C. and 1450° C., preferably 1250° C. and 1400° C., depending on the composition of the melt, desired viscosity and other parameters. Preferably, the melter wall is a double steel wall cooled by a cooling liquid, preferably water. Cooling water connections provided at the external melter wall allow a flow sufficient to withdraw energy from the inside wall such that melt can solidify on the internal wall and the cooling liquid, here water, does not boil.

The melter 1 may be mounted on dampers adapted to absorb vibrational movements.

The submerged burners comprise concentric tube burners operated at gas flows of 100 to 200 m/s, preferably 110 to 160 m/s and generate combustion of fuel gas and oxygen containing gas within the melt. The combustion and combustion gases generate agitation within the melt before they escape into the upper chamber and then through the chimney. These hot gases may be used to preheat the raw material and/or the fuel gas and/or oxidant gas (eg oxygen, industrial oxygen have an oxygen content 95% by weight or oxygen enriched air) used in the burners. The fumes are preferably filtered prior to release to the environment, optionally using dilution with ambient air to reduce their temperature prior to filtering.

The invention claimed is:

1. A process for manufacturing a vitrified material comprising the steps of:
   introducing a solid raw material mix comprising 0 to 60 w % of solid raw materials for mineral wool production and 40 to 100 w % of solely flocks of mineral wool into a submerged combustion melter, the flocks comprising mineral fibers and from 2 to 18 w % of organic binder;
   melting the solid raw material mix in the submerged combustion melter to form a liquid melt, where submerged combustion burns the organic binder and melts the mineral fibers;
   withdrawing at least a portion of the liquid melt from the submerged combustion melter; and
   forming the withdrawn liquid melt into a solid vitrified material.

2. The process of claim 1 in which the process is carried out in the absence of additional separate oxygen or oxygen enriched air injection into the melter.

3. The process of claim 1 in which the solid raw material mix comprises 50 to 100 w % of flocks of mineral wool.

4. The process of claim 1 in which the step of forming the withdrawn liquid melt into a solid vitrified material comprises fiberizing the liquid melt to produce mineral wool fibers selected from glass wool fibers and stone wool fibers.

5. The process of claim 1 in which the flocks comprise mineral fibers selected from glass fibers, glass wool fibers, stone wool fibers and combinations thereof.

6. The process of claim 1 in which the step of melting the solid raw material mix in the submerged combustion melter comprises generating a substantially toroidal melt flow pattern in the melt, having a substantially vertical central axis of revolution, comprising major centrally inwardly convergent flows at the melt surface.

7. The process of claim 6 which the speed vector of the melt moving upwards over submerged burners comprises a component directed towards a center of the melter and away from the melter wall.

8. The process of claim 6 which the speed vector of the melt moving upwards over submerged burners comprises a tangential component imparting a swirling movement to the melt flow in addition to the toroidal melt flow pattern.

9. The process of claim 1 in which the melt is subjected in the submerged combustion melter to a flow pattern which when simulated by computational fluid dynamics analysis shows a substantially toroidal melt flow pattern in the melt, comprising major centrally inwardly convergent flow vectors at the melt surface, with the central axis of revolution of the toroid being substantially vertical.

10. The process of claim 9 in which the fluid dynamics model is code ANSYS R14.5, taking into consideration the multi-phase flow field ranging from solid batch material to liquid melt and gas generated in the course of the conversion, and the batch-to-melt conversion.

11. The process of claim 9 in which the toroidal melt flow pattern is obtained by submerged combustion burners arranged at the melter bottom in a substantially circular burner zone imparting a substantially vertically upward directed speed component to the combustion gases, at a distance between adjacent burners of about 250-1250 mm.

12. The process of claim 11 in which the burners are arranged on a substantially circular burner line.

13. The process of claim 9 in which the toroidal melt flow pattern is obtained by submerged combustion burners arranged at the melter bottom in a substantially circular burner zone imparting a substantially vertically upward directed speed component to the combustion gases, at a distance between adjacent burners of about 500-900 mm.

14. The process of claim 1 in which the solid raw material mix comprises 60 to 100 w % of flocks of mineral wool.

15. The process of claim 1 in which the flocks of mineral wool have a dimension of about 5-30 mm across.

16. A process for manufacturing a vitrified material comprising the steps of:
   introducing a solid raw material mix comprising 0 to 60 w % of solid raw materials for mineral wool production and 40 to 100 w % of solely flocks of mineral wool into a submerged combustion melter, the flocks comprising mineral fibers and from 2 to 18 w % of organic binder and having a dimension of about 5-30 mm across, the process being carried out in the absence of additional separate oxygen or oxygen-enriched air injection into the melter for oxidation of the binder;
   melting the solid raw material mix in the submerged combustion melter to form a liquid melt, where submerged combustion burns the organic binder and melts the mineral fibers;
   withdrawing at least a portion of the liquid melt from the submerged combustion melter; and
   forming the withdrawn liquid melt into a solid vitrified material.

17. The process of claim 16 which the solid raw material mix comprises 50 to 100 w % of flocks of mineral wool.

18. The process of claim 16 in which the step of forming the withdrawn liquid melt into a solid vitrified material comprises fiberizing the liquid melt to produce mineral wool fibers, selected from glass wool fibers and stone wool fibers.

19. The process of claim 16 in which the flocks comprise mineral fibers selected from glass fibers, glass wool fibers, stone wool fibers and combinations thereof.

20. The process of claim 16 in which the step of melting the solid raw material mix in the submerged combustion melter comprises generating a substantially toroidal melt flow pattern in the melt, having a substantially vertical central axis of revolution, comprising major centrally inwardly convergent flows at the melt surface.

21. The process of claim 20 in which the speed vector of the melt moving upwards over submerged burners comprises a component directed towards a center of the melter and away from the melter wall.

22. The process of claim 20 in which the speed vector of the melt moving upwards over submerged burners comprises a tangential component imparting a swirling movement to the melt flow in addition to the toroidal melt flow pattern.

23. The process of claim 16 which the melt is subjected in the submerged combustion melter to a flow pattern which when simulated by computational fluid dynamics analysis shows a substantially toroidal melt flow pattern in the melt, comprising major centrally inwardly convergent flow vectors at the melt surface, with the central axis of revolution of the toroid being substantially vertical.

24. The process of claim 23 in which the fluid dynamics model is code ANSYS R14.5, taking into consideration the multi-phase flow field ranging from solid batch material to liquid melt and gas generated in the course of the conversion, and the batch-to-melt conversion.

25. The process of claim 23 in which the toroidal melt flow pattern is obtained by submerged combustion burners arranged at the melter bottom in a substantially circular burner zone imparting a substantially vertically upward directed speed component to the combustion gases, at a distance between adjacent burners of about 250-1250 mm.

26. The process of claim 25 in which the burners are arranged on a substantially circular burner line.

* * * * *